United States Patent [19]

Fisher

[11] Patent Number: 5,139,378

[45] Date of Patent: Aug. 18, 1992

[54] ADJUSTABLE RETAINING APPARATUS

[75] Inventor: Albert D. Fisher, La Harpe, Kans.

[73] Assignee: Midland Brake, Inc., Kansas City, Mo.

[21] Appl. No.: 663,179

[22] Filed: Mar. 1, 1991

[51] Int. Cl.$^5$ ............................................ F16B 21/18
[52] U.S. Cl. ................................... 411/353; 411/552
[58] Field of Search ............... 411/347, 552, 337, 350, 411/349, 351, 549, 550, 553, 371

[56] References Cited

U.S. PATENT DOCUMENTS

| | | | |
|---|---|---|---|
| 1,251,772 | 1/1918 | Guett | 411/353 |
| 1,666,783 | 4/1928 | Kries | 411/337 |
| 1,772,835 | 8/1930 | Jurad | 411/347 |
| 1,803,431 | 5/1931 | Hill . | |
| 2,327,555 | 8/1943 | Purinton | 411/554 |
| 2,334,676 | 11/1943 | Jones . | |
| 2,588,951 | 3/1952 | Anstett . | |
| 2,599,207 | 6/1952 | Spahr et al. . | |
| 2,727,220 | 12/1955 | Buchanan et al. | 411/999 X |
| 3,009,381 | 11/1961 | Rapata | 411/337 |
| 3,272,512 | 9/1966 | Zarm . | |
| 3,460,210 | 8/1969 | Ellis . | |
| 3,849,839 | 11/1974 | Zimber | 411/349 X |
| 3,990,131 | 11/1976 | Okamura | 403/408.1 X |
| 4,117,928 | 10/1978 | Schenk | 411/349 X |
| 4,522,541 | 6/1985 | Bidwell . | |
| 4,657,462 | 4/1987 | Hoen . | |

FOREIGN PATENT DOCUMENTS

| | | | |
|---|---|---|---|
| 24778 | 2/1963 | German Democratic Rep. | 411/347 |
| 381921 | 11/1964 | Switzerland | 411/347 |
| 588886 | 6/1947 | United Kingdom | 411/549 |

*Primary Examiner*—Rodney M. Lindsey
*Attorney, Agent, or Firm*—Leydig, Voit & Mayer

[57] ABSTRACT

This apparatus is a fastener assembly for retaining a spring, such as used in the brake actuators of heavy-duty trucks, in a compressed state, including a fully-compressed state, the assembly being variably adjustable to accommodate variations in actual spring dimensions and tolerances. The compressed spring is held between first and second members by a fastener assembly comprising a washer and a clip, the washer having an opening therein for receiving the clip. The clip has an enlarged head with sloping shoulders which ride on the periphery of the opening in the washer, and a shank which engages the second member and maintains the clip stationary with respect thereto. The shape of the periphery of the opening in the washer and the slope of the shoulders on the head of the clip are designed such that when the washer or clip is rotated with respect to the other from a rest position the spacing between the first and second members is progressively reduced, whereby the fastener assembly is selectively adjusted to accommodate the compressed spring in its minimum selected dimension.

12 Claims, 3 Drawing Sheets

ADJUSTABLE RETAINING APPARATUS

FIELD OF THE INVENTION

This invention relates to apparatus for retaining a spring or like object in a stable state, e.g., compression, and in particular, for compressing the spring to a minimum, selected dimension dependent upon the tolerances to which the spring and the retaining apparatus of this invention may be manufactured.

BACKGROUND OF THE INVENTION

Brake mechanisms for vehicles and, in particular, heavy duty trucks, typically include a spring brake actuator. A spring brake actuator is typically held in a caged or compressed state for storage and shipping. Further, such actuators are typically installed and adjusted while in the compressed state. A retaining mechanism is required to hold a spring actuator in its compressed state because it would be difficult for a human operator to manually compress a spring brake actuator. Rather, machines utilizing compressed air are required to exert several thousand pounds of force on the opposite ends of a spring in a spring brake actuator to compress it. While the spring is held in a compressed state, a retaining mechanism is installed to hold the spring brake actuator in its compressed state. After storage, shipment and/or installation, the retaining mechanism is removed. The retaining mechanism holds the spring brake actuator in its compressed state, while the operator installs the spring brake actuator and adjusts the brake mechanism before removing the retaining apparatus.

The prior art is illustrated in FIG. 1, wherein there is shown a clip or key 10' adapted to be inserted into a spring support 14 to maintain the spring identified by the numeral 60 in a compressed state, as shown in FIG. 3B. The clip 10' includes an enlarged head 20', a shank 16' extending downwardly therefrom and a pair of tabs 18a' and 18b' extending out from the shank 16' in perpendicular relation thereto. The prior art clip 10' is inserted into and engages the spring support 14, which compresses as shown in FIGS. 3B and 3C, a circular shaped base and a housing 42 for retaining therebetween a spring brake actuator in a compressed or caged state. In particular, the clip 10' is inserted through a release boss 50 and an opening 52 of a collar 46. As particular shown in FIG. 3C, the tabs fit through a pair of slots 54a and b. Thereafter, the clip 10' is rotated, whereby the tabs 18a' and 18b' engage the lower surface of the lip 48, thereby, retaining the housing 42 and the base 40 at a fixed distance therebetween and holding the spring 60 in its compressed state. Examination of FIG. 1 indicates that the spacing between the base 40 and the housing 42 is fixedly set by the distance indicated by the letter L between the top of each of the tabs 18a' and 18b' and the corresponding one of the straight edges 21a' and 21b'. The straight edges 21a' and 21b' are disposed perpendicular to the shank 16' whereby there is no adjustment in the spacing between the housing 42 and the base 40. Such a construction presents a problem in that the clip 10' and the spring 60 are typically manufactured with some tolerances. As a result of these tolerances, the actual dimension from one end to the other of the spring 60 in its compressed state, will vary. Likewise, the spacing between the housing 42 and the base 40 will vary to some degree because the prior art clip 10' and its distance L will have some tolerance.

In the installation of the spring 60 into its brake mechanism, it is desirable to compress the spring 60 to a point where the spring 60 may not be further compressed. A totally compressed spring 60 is relatively easy to install and adjust. However, with the clip 10' of the prior art, it is necessary to set the distance L to take into account the manufacturing tolerances with which the clip 10' and the spring 60 are manufactured. In practice, the distance L is set such that in most instances that the spring brake actuator is not totally compressed, thus increasing the difficulty of installation and adjustment of the spring 60.

U.S. Pat. Nos. 4,657,462 and 2,588,951 are examples of prior art fasteners for retaining two or more plates together and including a clip and a spring. First, such prior art is not concerned with maintaining the included spring in a fully compressed state, much less teach that the mechanism for providing a variable adjustment of the distance between the ends of a spring such that the spring is held by the fastener in a fully compressed state.

SUMMARY OF THE INVENTION

It is an object of this invention to provide the apparatus and method for variably setting and retaining a spring in its maximum compressed state, i.e., the dimension of the spring between its ends is at a minimum.

It is a further object of this invention to compensate for the tolerances inherent in the manufacture of a spring brake actuator, its spring and a retaining clip associated therewith, whereby the dimension between the ends of the spring may be variably set and held.

In accordance with these and other objects, there is provided a fastener assembly for holding any spring in its compressed state. Each spring to be so held has opposite ends and is compressible to its own unique minimum dimension. The spring is held in a spring support which comprises first and second members for respectively engaging the opposite ends of the spring. The fastener assembly of this invention holds the first and second members of the spring support together, and comprises a washer with an opening therethrough for receiving a clip. The clip has an axis and includes a head, a shank extending from the head, and a mechanism for engaging the second member and maintaining the clip stationary with respect thereto. The washer is designed to rest on the first member of the spring support, i.e., release boss, to receive the clip through its opening. The hole is configured to define a rest position for the clip when inserted in the opening and for engaging the head to move the clip through the opening when the washer is rotated about the stationary clip thereby reducing the spacing between the first and second members of the spring support and selectively compressing the spring to its minimum dimension.

In an illustrative embodiment of this invention, the hole comprises first and second D-shaped holes, each having a relatively straight peripheral portion and a curved peripheral portion. The straight peripheral portions of the first and second D-shaped holes are aligned of each other to form the rest position for the clip.

In a further feature of this invention, the engaging mechanism comprises a pair of tabs attached to that end of the shank remote from the head and extending from the axis. Further, the clip includes a pair of shoulders extending from the opposite sides of the shank in a slopping relationship with respect to the axis. The curved peripheral portions of the first and second D-shaped holes are disposed in opposite directions with respect to each other to engage respective ones of the slopping shoulders when the clip is disposed within the opening, whereby when one of the clip and the washer is rotated with respect to the other, the clip is moved through the opening of the washer.

It is a further aspect of this invention that the degree of curvature of each of the curved peripheral portions is selected to impart a relative movement between the washer and the clip when one of said washer and clip is rotated with respect to the other.

Further, a method of assembling the spring in the spring support comprises the step of supporting the ends of the spring on the first and second members, respectively. Next, the first and second members are pressed together, whereby the spring is also compressed. With the spring compressed, the washer is placed on the first member, and the clip is inserted through the opening of the washer. Next, the engaging mechanism is engaged with the second member to render the clip stationary with respect to the second member. Then, one of the washer and the clip is selectively rotated with respect to the other, whereby the clip is directed through the opening and the spacing between the first and second members is decreased until the minimum compressed dimension of the spring has been selectively set.

BRIEF DESCRIPTION OF THE DRAWINGS

Other objects and features of the present invention will be apparent from the following detailed description of the present invention, taken, in combination with the accompanying drawings.

DETAILED DESCRIPTION OF A PREFERRED EMBODIMENT OF THIS INVENTION

Figure 1:
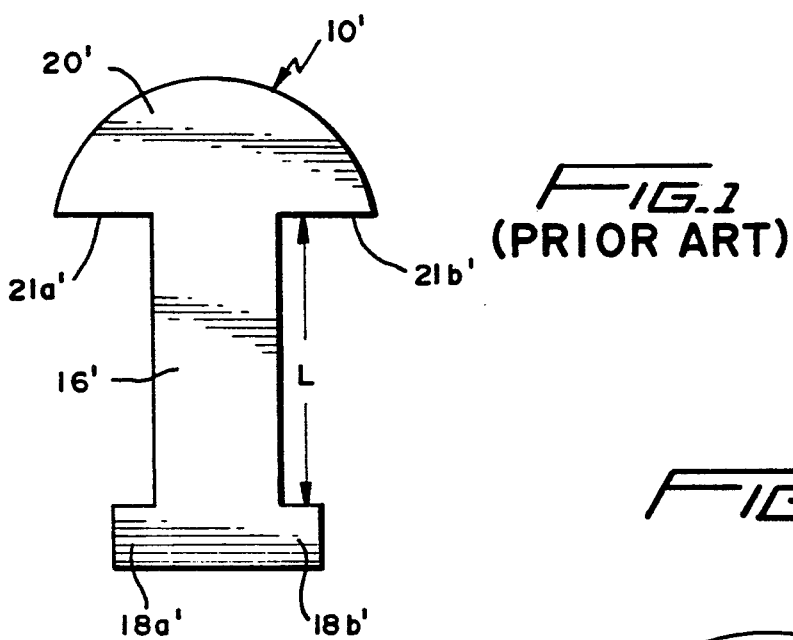
FIG. 1 is a side view of a clip in accordance with the prior art.
Figure 2B:
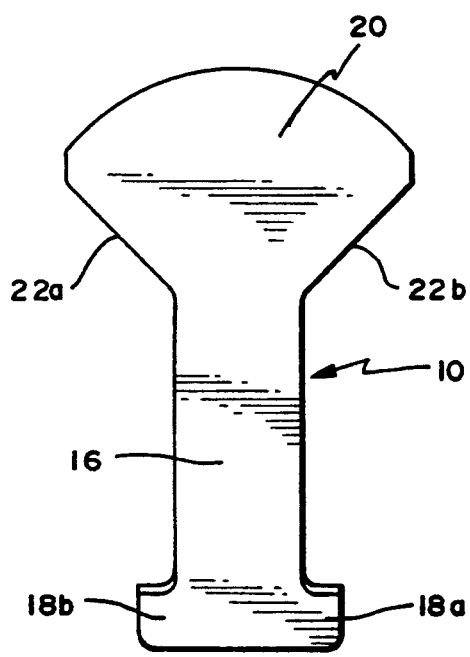
FIGS. 2A and 2B are respectively a plan view of a washer and a clip, which are designed to engage each other and to retain a spring brake actuator in accordance with the teachings of this invention.
Figure 2A:
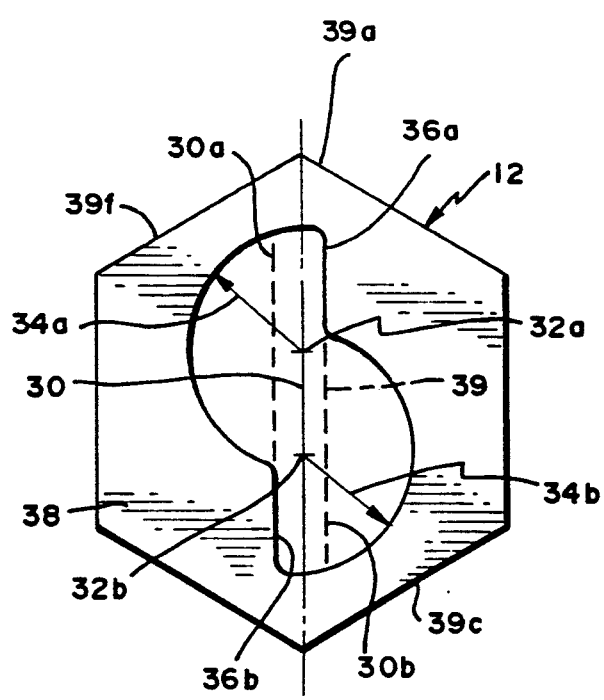

Referring now to the drawings and in particular to FIG. 2B, there is shown a key or clip 10 adapted in accordance with the teachings of this invention to be used with a washer 12 as shown in FIG. 2A. The clip 10 of this invention includes an enlarged head 20, a shank 16 extending downward along an axis 17 as shown in FIG. 2B and a pair of tabs 18a and b extending from the shank 16 in a perpendicular relationship to the axis 17. The enlarged head 20 includes a pair of slopping shoulders 22a and b extending from and slopping with respect to the shank edges. The slopping shoulders 22a and b mate with the washer 12 as will be explained below.

Figure 3A:
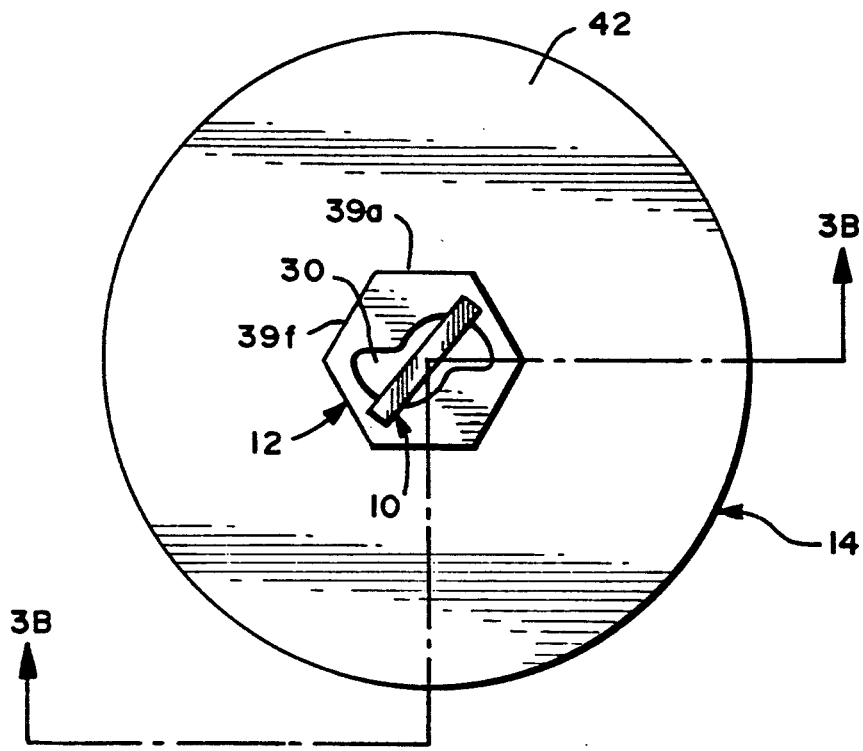
FIG. 3A is a top, plan view of a spring support with the clip and washer inserted therein to retain the spring in a maximum compressed state.

Referring to FIG. 2A, there is shown the washer 12 having an opening 30 therethrough for receiving the clip 10 in a manner as shown in FIGS. 3A and B. The opening 30 comprises a pair of D-shaped holes 30a and b offset from and overlapping each other as shown in FIG. 2A. The composite opening 30 has an S-shape. Each of the D-shaped holes 30a and b is generated by a corresponding one of the radii 34a and b rotated about a corresponding one of the points 32a and b. The points 32a and b define a rest position outlined by a dotted line and identified by the numeral 39. The rest position 39 encloses the points 32a and b and opposite surfaces of the rest position 39 coincide with the straight edges 36a and b of the D-shaped holes 30a and b. The curved portions 37a and b of the D-shaped holes 30a and b are disposed in opposite directions. When the clip 10 is inserted within the hole 30 and is held stationary, the washer 12 may be rotated only in one direction, e.g., clockwise as shown in FIG. 2A. If the washer 12 were rotated in the opposite direction, it would be blocked when the straight edges 36a and b of the washer 12 engage the opposite sides of the stationary clip 10.

Figure 3B:
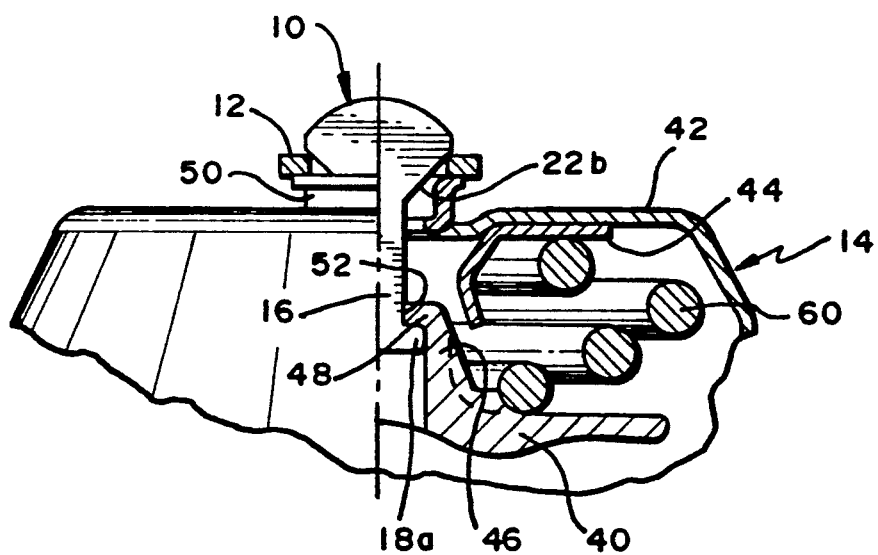
FIG. 3B is a side, partially broken away showing of the spring support shown in FIG. 3A and sectioned along line 3B—3B of FIG. 3A.

As illustrated, particularly in FIGS. 3A and B, the clip 10 and the washer 12 are designed to be inserted into and to retain the spring support 14 together such that the spring 60 held therein is maintained in a compressed or caged state. It is understood that FIGS. 3A and B show a portion of the spring brake actuator, which receives the spring 60. The spring support 14 includes a lower base 40 and an upper housing 42, each of a circular configuration. The lower base 40 includes a centrally disposed collar 46, which extends upward as shown in FIG. 3B. The collar 46 includes an opening 52 as particularly shown in FIGS. 3B and C. The opening 52 has a pair of slots disposed on opposite sides thereof for receiving the tabs 18a and b, whereby the leading end of the clip 10 may be inserted through the opening 52 with its tabs 18a and b passing respectively through the slots 54a and b and, thereafter, the clip 10 rotated with respect to the lower base 40 so that the tabs 18a and b engage the lower surface of the lip 48. As best illustrated in FIG. 3D, after insertion and rotation, the clip 10 retains the housing 42 and the lower base 40 together as the spring 60 exerts a force as would otherwise tend to separate the housing 42 and the base 40.

As shown in FIG. 3B, the housing 42 of the spring support 14 further includes an L-shaped, cylindrical shield 44 attached to the undersurface of the housing 42 to define with the base 40 and its collar 46, a space for receiving and compressing the spring 60. A release boss 50 is centrally disposed of and attached to the housing 42 to receive the clip 10 and its washer 12, as best shown in FIG. 3B, to align the clip 10 with the opening 52 of the base 40. When the clip 10 is inserted through the release boss 50 and the opening 52 so that its tabs 18a and b engage the upper surface of the retaining lip 48, the slopping shoulders 22a and b engage the release boss 50 and the tabs 18a and b engage the retaining lip 48 of the base, whereby the housing 42 and the lower base 40 are spaced from each other a variable, selected distance so that the spring 60 is compressed within that space defined by the housing 42 and the lower base 40; that space has a vertical dimension as shown in FIG. 3B which is variably defined by the rotational position of the clip 10 in a manner as will be discussed below.

Figure 3C:
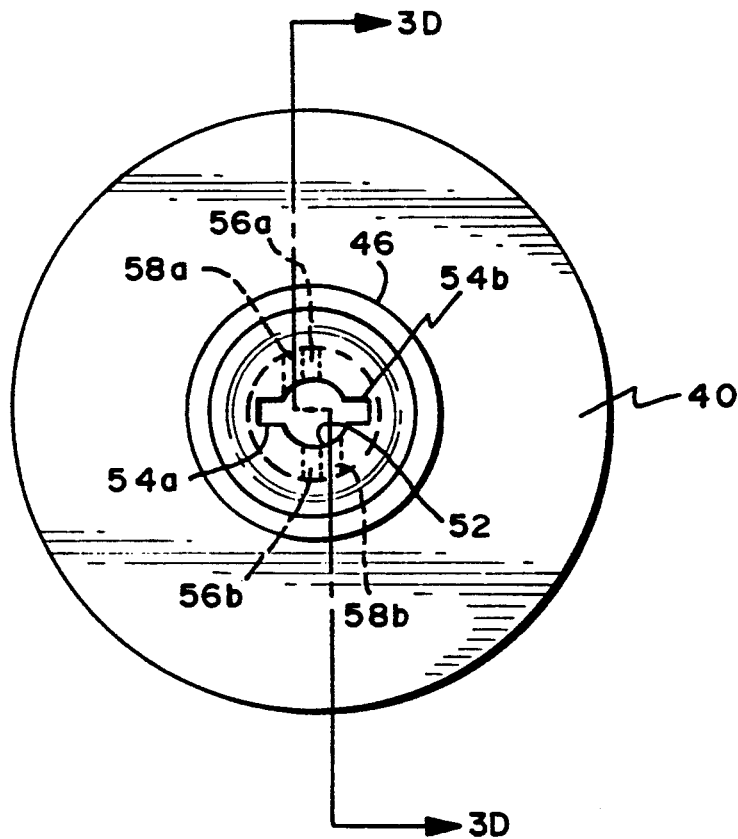
FIG. 3C is a top, plan view of the spring support with its shield removed to show the base, the collar and the slotted opening therethrough for receiving the clip in accordance with the teachings of this invention.
Figure 3D:
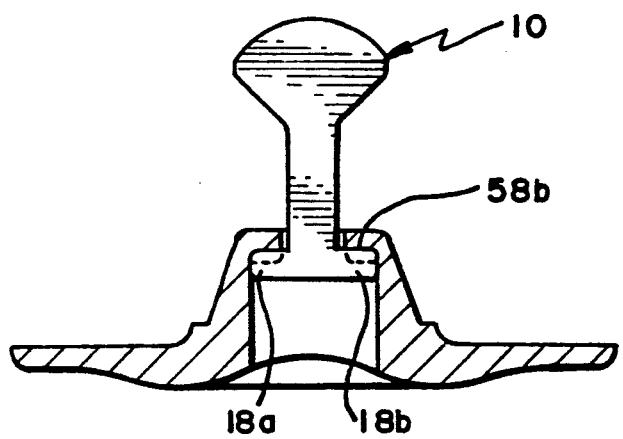
FIG. 3D is a sectioned view of the spring support taken along lines 3D—3D of FIG. 3C to illustrate how the clip engages the spring support.

Further, as best shown in FIG. 3C, a pair of retaining depressions 58a and b are provided for receiving and retaining the tabs 18a and b to prevent inadvertent movement or rotation of the clip 10 during storage and shipment. A pair of stops 56a and b are disposed adjacent their corresponding retaining depressions 58a and 58b, whereby the clip 10 may be rotated after insertion through the slots 54a and b in a clockwise direction as shown in FIG. 3C until the tabs 18a and b engage the stops 56a and b. Upon such engagement, the tabs 18a and b are aligned with their depressions 56a and b so that the operator may readily grasp and move the clip 10 upward thereby inserting the tabs 18a and b into their depressions 56a and b respectively to be retained therein.

As shown in FIG. 3A, the periphery of the washer 12 is formed of six straight surfaces or bevels 39a-f, whereby a suitable tool such as a wrench may grasp opposing surfaces 39 to rotate the washer 12. An indicium 38 such as the word "TOP" is disposed only on a single surface of the washer 12. In assembly, the operator disposes the washer 12 on the release boss 50 of the spring support 14 so that the indicicum 38 is viewable. When so disposed, the D-shaped holes 30a and b will control the direction of rotation a will be explained below.

After the clip 10 is inserted through the opening 30 of the washer 12, it is attached with the spring support 14 and its vertical dimension as shown in FIG. 3B is variably set so that the spring 60 is fully compressed. Initially, the washer 12 is disposed upon the release boss 50 and the clip 10 is inserted downward as shown in FIG. 3B through the opening 52 within the lower base 40, before the tabs 18a are disposed through the slots 54a and b as shown in FIG. 3C. Initially, the housing 42 and the base 40 of the spring support 14 are compressed together as high pressure air is applied to the compressing mechanism until the spring 60 is fully compressed. Next, the operator grasps the enlarged head 20 of the clip 10 and rotates it in a clockwise direction as shown in FIG. 3C until the tabs 18a and b engage respective ones of the stops 56a and b. Upon engagement, the operator pulls the clip 10 upwards as shown in FIG. 3B, whereby the tabs 18a and b are pulled into and are retained by the depressions 58a and b. Typically, there will be at this time some slack between the washer 12, the release boss 50 and the slopping shoulders 22a and b. That slack is taken up by rotating the washer 12 in a clockwise direction as shown in FIG. 3A. Illustratively, a suitable tool such as a wrench is used to engage the multifaceted surfaces 39 of the washer 12 and to rotate the washer, whereby as the enlarged head 20 is lifted upward as shown in FIG. 3B, the support 40 and the housing 42 are pulled together against the opposing ends of the spring 60 and any slack therebetween is taken up.

After adjustment, the air pressure within the compression mechanism is released, whereby the spring 60 pushes the housing 42 and the lower base 40 apart, thus, pulling the enlarged head 20 of the clip 10 into its washer 12. The washer 12 is made of a relatively softer material than that of the clip 10. In an illustratively embodiment of this invention, the key 10 is made of that steel alloy identified as High Strength Low Alloy (HSLA), whereas the washer 12 is made of a hot roll steel identified as one of 1018. Thus, the harder clip 10 bites into the relatively soft washer 12, thereby preventing the clip 10 from rotating back towards its rest position 39, even when subjected to vibration or incidental contact. After the variable slack within the spring 60 has been taken up, i.e., the spring is compressed to its maximum degree, the air pressure is released from the compressing machine and the spring support 14 and the compressed spring 60 therein, are ready for shipment, storage and installation within a vehicle's brake mechanism.

In a further aspect of this invention, the hex shape of the straight surfaces 39a-f of the washer 12 permits a wrench to be used to aid in loosening the washer 12 after the actuator is installed on a vehicle should available air pressure for installers prove insufficient to fully compress the spring 60. After the washer 12 and clip 10 have been removed, the actuator is ready for service and the washer 12 and clip 10 will be discarded. The washer 12 and shipping clip 10 are not intended to be reused, and are not approved for use as tools for rebuilding or servicing an actuator where compression of the spring 60 is necessary. A heavy duty Acme threaded release tool assembly is provided with each actuator to be used for field service.

The washer 12 includes an indicium 38, e.g., "TOP", marked on a single surface thereof indicating that this surface should be disposed to be visible to the operator. Such orientation of the washer 12 ensures that when the washer 12 is rotated in a clockwise direction as shown in FIG. 3A, that the clip 10 will be pushed upward due to the interaction with the D-shaped holes 30a and b. If the washer 12 were disposed with its indicium 38 disposed downwardly, the washer rotation would tend to rotate the clip 10 and would not produce the variable take-up action.

Each of the D-shaped holes 30a and b is generated by a corresponding radius 34a and b of constant length, about a corresponding center 32a and b for approximately 180°. The length of the radii 34a and b is set between two limits. If the length of the radii 34 is set too long the opening 30 will approximate a circle, as opposed to two overlapping D-shaped holes, whereby the incremental unit of vertical motion imparted per degree of rotation of the washer 12, is decreased. Conversely, if the length of the radii 34 is decreased, the incremental displacement of the clip per degree of washer rotation, will increase. However, as the radii 34a and b become smaller, the angle of the clip 10 with respect to a tangent on the peripheries of the D-shaped holes 30a and b, will tend to be acute, whereby the rotation of the washer 12 will tend to direct the clip 10 toward its rest position as opposed to having the clip 10 bite into the washer 12. Further, the width 41 of the passage between the D-shaped holes 30a and 30b, is less than the width of the shank 16 of the clip 10 to thereby limit the rotation of the clip 10 and to prevent disengagement of one of the shoulders 22a and b from a corresponding one of its curved portions 37a and b.

While this clip and washer assembly has been shown and described as being advantageously applicable to retaining a spring brake actuator compressed within its spring support, it is not my desire or intent to unnecessarily limit the scope or the utility of the improved features by virtue of this illustrative embodiment. It is further contemplated that the assembly of this invention could be employed to fasten any two objects, particularly plate like objects, together where the diameter thereof would vary.

What is claimed is:

1. A fastener assembly for holding any already-compressed spring in its minimal compressed state, each spring having opposite ends and being compressible to its own unique minimum dimension, the already-compressed spring being held in a spring support which comprises first and second members for respectively engaging the opposite ends of the already-compressed spring, said fastener assembly holding the first and second members of the spring support together, said fastener assembly comprising:

(a) a clip having an axis and including an enlarged head, a shank extending from said enlarged head along said axis, a pair of tabs attached adjacent to that end of said shank remote from said enlarged head and extending from said axis, and a pair of shoulders extending from said head to the opposite sides of said shank in a sloping relation with respect to said axis; and (b) a washer having an opening therethrough for receiving said clip, said opening including first and second overlapping-D-shaped holes, each having a relatively straight peripheral portion and a curved peripheral portion, said straight portions of said first and second overlapping-D-shaped holes being aligned with each other to form a rest position for the shoulders of said clip;

(c) said washer designed to rest on the first member of the spring support and disposed to receive the shank of said clip through said opening, each of said pair of sloping shoulders engaging a peripheral edge of said washer corresponding to one of said first and second overlapping-D-shaped holes, and said pair of tabs being disposed to directly engage the second member of the spring housing to present the rotation of said clip as said washer is rotated from its rest position to direct said clip through said opening, whereby rotation of said washer from its rest position relative to said clip progressively reduces the spacing between the first and second members of the spring support and selectively adjusts the spacing to accommodate the unique minimum dimension of the particular already-compressed spring.

2. The fastener assembly as claimed in claim 1, wherein said firs and second overlapping-D-shaped holes define a restricted passage therebetween, said restricted passage having a dimension less than the width of the shank of the clip.

3. The fastener assembly as claimed in claim 1, wherein said straight portions of said overlapping-D-shaped holes are disposed substantially parallel with each other to define said rest position.

4. The fastener assembly as claimed in claim 1, wherein said curved portions of said first and second overlapping-D-shaped holes are disposed in opposite directions, whereby said washer may be rotated in but a single direction when a stationary clip is disposed through said opening.

5. The fastener assembly as claimed in claim 1, wherein one of said clip and washer is made of a relatively hard material and the other is made of a relatively soft material, such that when the spring presses said clip and washer together the harder material will bite into the softer material, preventing the relative rotation of said washer with respect to said clip.

6. The fastener assembly as claimed in claim 1, wherein each curved portion of said first and second overlapping-D-shaped holes is generated by a radius rotated about a center disposed within said rest position.

7. The fastener assembly as claimed in claim 6, wherein each of said radii is of a fixed length.

8. The fastener assembly as claimed in claim 1, wherein said periphery of said washer includes at least two opposing flat surfaces to be griped by a tool, whereby said washer may be rotated about a clip disposed through its opening.

9. A fastener assembly for holding any spring in its already-compressed state, each spring having opposite ends and being compressible to its own unique minimum dimension, the already-compressed spring being held in a spring support which comprises first and second members for respectively engaging the opposite ends of the already-compressed spring, said fastener assembly holding the first and second ends of the spring support together, said fastener assembly comprising:

(a) a washer having an opening therethrough for receiving a clip;

(b) said clip having an axis and including a head with a pair of shoulders inwardly sloping with respect to said axis and terminating on opposites of a shank which extends from said head and shoulders, said clip having means for directly engaging the second member and maintaining said clip stationary with respect thereto;

(c) said washer being designed to rest on the first member of the spring support and to receive said clip through said opening;

(d) said opening in said washer including first and second substantially D-shaped holes, each having a relatively straight peripheral portion and a curved peripheral portion, the peripheries of each of said straight portions being aligned with the other to form a rest position for the shoulders of said head, the degree of curvature of the peripheries of each of said curved portions being selected with respect to the slope of said shoulders to impart a relative movement between said washer and said clip along said axis when on e of said washer and clip is rotated with respect to the other from said rest position, thereby progressively reducing the spacing between the first and second members of the spring support so as to retain the already-compressed spring at its own unique minimum dimension.

10. The fastener assembly as claimed in claim 9, wherein said means for directly engaging comprises a pair of tabs attached to that end of said shank remote from said head and extending from said axis.

11. The fastener assembly as claimed in claim 10, wherein said curved peripheral portions of said first and second overlapping-D-shaped holes are disposed in opposite directions with respect to each other to engage respective ones of said sloping shoulders when said clip is disposed within said opening, whereby when one of said clip and said washer is rotated with respect to the other, said clip is displaced with respect to said washer.

12. The fastener assembly as claimed in claim 9, wherein said head has a first maximum dimension perpendicular with respect to said axis, each of said first and second overlapping-D-shaped holes being generated by a corresponding radius of a second dimension less than said first dimension.

* * * * *